United States Patent [19]

Hall

[11] 4,268,387

[45] May 19, 1981

[54] FILTRATION SYSTEM

[75] Inventor: John E. Hall, Carmel, N.Y.

[73] Assignees: John E. Hall, Carmel; Hall Decker McKibbin & Singer, Inc., New York, both of N.Y. ; part interest to each

[21] Appl. No.: 90,012

[22] Filed: Oct. 31, 1979

Related U.S. Application Data

[63] Continuation-in-part of Ser. No. 621,932, Mar. 19, 1979, abandoned.

[51] Int. Cl.³ ............................................. E04H 3/20
[52] U.S. Cl. .................................. 210/169; 210/260; 210/333.01
[58] Field of Search ............. 210/169, 416 AS, 333 R, 210/260; 119/3, 5

[56] References Cited

U.S. PATENT DOCUMENTS

| 3,490,416 | 1/1970 | Kelly et al. | 210/169 |
| 3,529,574 | 9/1970 | Kelly | 210/169 |
| 3,540,591 | 11/1970 | Yamazaki | 210/169 |
| 3,827,560 | 8/1974 | Morton | 210/169 |
| 3,834,537 | 9/1974 | Brett | 210/169 |
| 4,098,230 | 7/1978 | Jackson | 210/169 |
| 4,115,276 | 9/1978 | Kelly | 210/169 |

Primary Examiner—Theodore A. Granger

Attorney, Agent, or Firm—McAulay, Fields, Fisher, Goldstein & Nissen

[57] ABSTRACT

A filtration system, especially for use in aquaria has a lower or first chamber, a middle or second chamber and an upper or third chamber with an interconnecting valve to provide fluid communication therebetween. A microfilter is disposed between the first and second chambers. The upper or third chamber may be divided into two separate parts; one of which parts forms a gravel filter, and the other of which parts forms a pump conduit between the valve and an outlet of the system for connection to a suction pump. Alternatively, a separate pump conduit may be used. The valve is switchable between a first position wherein water is drawn through the gravel filter, into the upper or third chamber then into the middle or second chamber via the valve, through the microfilter into the lower or first chamber from which it is pumped through the valve and out the pump through the pump conduit; and a second position wherein the water flow is similar to that of the first position except that it flows in the reverse direction through the microfilter, that is into the lower or first chamber and then into the middle or second chamber. The reversal of flow through the microfilter provides for flushing the microfilter, thereby maintaining its efficiency. The water from the pump, during flushing, should be directed out of the aquarium.

11 Claims, 23 Drawing Figures

FILTRATION SYSTEM

CROSS-REFERENCE TO RELATED APPLICATION

This is a continuation-in-part of U.S. application Ser. No. 621,932 filed Mar. 19, 1979, now abandoned.

BACKGROUND OF THE INVENTION

The present invention relates to a filter and valve system and more particularly to such a system especially suited to aquarium pollution control.

Among the many problems associated with the keeping of tropical fish, filtration is by far the most important. The purpose of filtration is to reduce the level of pollution in the water while maintaining therein certain beneficial chemical and biological properties. Without some form of filtration, the chance of success in an aquarium is very slight.

Before considering the different types of filtration and their effect on pollution, it will be helpful to first consider the basic principles of pollution control. There are three basic requirements for controlling pollution: the aquarium must be kept (1) physically clean, (2) biologically clean and active, and (3) chemically clean and balanced.

Physically Clean

Water which is physically clean has no suspended particles. Many fish will not thrive in water that is not physically clean. In addition, an esthetically pleasing tank appearance is only possible with water that is physically clean. The gravel must also be kept somewhat free of debris or the flow of water through the gravel will be restricted. In a marine (salt-water) tank, this would have the effect of lowering the pH and decreasing the effectiveness of the bacteria. In this sense, the cleanliness of gravel directly affects the chemical and biological properties of the water. Gravel type filters are shown, for example, in U.S. Pat. No. 3,835,813 to Katz; U.S. Pat. No. 3,814,254 to Schatz; and numerous other references, in one form or another.

Biologically Clean and Active

Water which is biologically clean is relatively free of harmful organisms and harmful bacteria. It should also be free of superfluous suspended bacteria which would give the water a cloudy appearance. For an aquarium system to be biologically active, a growth of aerobic bacteria and nitrifying bacteria must be present and provided with some form of gravel bed. A large surface area on the filtering media would provide a large population of aerobic bacteria to decompose food and solid waste particles. The gravel bed supports the nitrifying bacteria which ultimately produce nontoxic nitrates from ammonia, carbon dioxide, oxygen, carbonate and bicarbonate. Where there is an inadequate flow of oxygenated water, decomposition can occur via the action of anaerobic bacteria to produce hydrogen sulfide and methane which are very toxic. A biological filtering system is described, for example, in U.S. Pat. No. 3,387,587 to Kelley et al and U.S. Pat. No. 3,835,813 to Katz (algae).

Chemically Clean and Balanced

Water which maintains the same chemical composition as when the tank was first set up would be chemically clean. However, tank inhabitants alter the chemical composition quickly using trace elements and adding organic compounds. Although activated carbon is somewhat experimental, it is very effective in removing a variety of substances when used carefully. Ion exchange resins have also been used to remove ammonia and nitrates but they are not usually necessary when a biological filter is working properly. It should be noted that the easiest method of keeping the water chemically clean is to make frequent partial water changes.

With these principles in mind we can look at filtration as it now works in aquarium systems. The three basic types of filters are (1) power filters, (2) undergravel filters, and (3) microfilters.

Power Filters

This type of filter is the most commonly used filter in both fresh and marine aquariums. A power filter usually consists of some sort of plastic container with a false bottom to hold the filter media, a siphon tube, and a motor connected to a rotor. The water from the aquarium is siphoned into the plastic container where it is passed through a filter media (usually polyester floss and carbon). The water then passes through the false bottom of the container to the motor driven rotor which serves to pump the cleaned water back into the tank. The advantage of using this type of filter is that it is fairly effective in removing particles from the water at a reasonable price. The disadvantages of this type of filter are many:

(1) They take up space in the back of an aquarium, with the larger and more effective filters taking up a great deal of space.

(2) By the nature of their design, the surface area of the filter media is limited in spite of the fact that most filtering is done on the surface of the filter media.

(3) The filtering relies on gravity which restricts the flow of water when the filter media becomes clogged. However, when the filter media becomes clogged, it filters smaller particles which makes it more effective. Therefore, a compromise must be made between maximum filter effectiveness and maximum water flow.

(4) Siphons are hard to start and may stop working if the water level drops a couple of inches.

(5) They are often noisy.

Undergravel Filters

Another type of filter which is used a great deal is the undergravel filter. This is used primarily for marine aquariums but is also effective in fresh water aquariums. This type of filter usually uses an air pump to create a water flow in tubes which run from the filter plate to the surface of the water. In this way, water is drawn through gravel and below the undergravel filter plate where it is lifted to the surface and the cycle is started again. The important role it plays in a marine aquarium is to buffer the pH of the water by using limestone or dolomite in place of gravel and having the water pass through this buffering process. The undergravel filter also allows water to pass through a bed of bacteria which maintains the biological filter. The advantages of this type of filter are its effectiveness and its reasonable cost. The disadvantages are as follows:

(1) Air pumps are often very noisy.

(2) The tubes needed for water lift clutter the aquarium.

(3) The tubes become clogged with debris and must be cleaned by removing the filter and gravel about once a year.

Microfilters

The category of microfilters is extremely limited at this time, but shows great promise. The most widely used microfilter is the "Diatom Filter" which uses diatomaceous earth powder as a filter media. This type of filter extracts microscopic particles under 20 microns. Various plastic cartridge microfilters are now made but not used in aquarium filters at the present time. The main disadvantage of the "Diatom Filter" is that it is complicated to use and very bulky. A properly designed microfilter would be of tremendous value in keeping tropical fish by creating sparkling clean water and removing most parasites and disease.

It is therefore a main object of this invention to provide a filtering system which combines the advantages of gravel filtration, particulate filtration, and microfiltration while overcoming the disadvantages previously encountered in these systems.

It is a related object to provide an effective filtering system for an aquarium which does not take up space behind the aquarium and may be formed as a single unit.

It is a further related object to provide a quiet and otherwise esthetically non-obtrusive filter for use in an aquarium.

It is a still further object to provide a filter valving and chamber system that provides for convenient backwashing or unclogging of the filter without removal from the aquarium.

SUMMARY OF THE INVENTION

The present invention provides a filter and valve system for removing impurities from liquids, particularly from tanks of liquid such as aquariums. Basically the system combines gravel filtration, particulate filtration, and microfiltration in a bottom mounted unit, in a way to increase the efficiency of the filtration over all. The system is also designed to be very simple to use while creating an esthetically pleasing aquarium appearance, when used in a home aquarium.

In a first preferred system there is provided:

A base plate supporting a channeling valve and sealing the bottom of the valve.

A filter layer or plate of porous nylon or other material forming a microfilter with the ability to filter preferably down to about 20 microns. This layer is disposed above and spaced apart from the base plate to form a lower first chamber therebetween.

A solid dividing layer or plate is disposed above and spaced apart from the filter layer plate to form a middle filtration second chamber. Both the solid dividing plate and the filter plate have an opening formed therethrough to permit the channeling valve to pass therethrough.

A porous top plate is disposed above the solid plate and forms an upper third chamber therebetween. The top plate supports a layer of gravel and is perforated or slotted to permit water to pass therethrough into the third chamber. The perforations or slots are preferably relatively large, but small enough to hold back the gravel. An adjustably opened upward extension can be provided to extend above the gravel for control of the gravel filtration volume and to capture free swimming organisms for filtration from the water. The top plate has a non-perforated portion which covers and seals the top of the channeling valve, and includes a small opening to allow a valve control knob to extend therethrough to permit manual rotation of the valve.

For esthetic reasons, the top plate tapers downwardly in a forward direction and is sealed against the filter layer plate, dividing layer plate and base plate to seal the front of the system. The forward taper of the top plate is in accordance with usual aquarium practice of having the gravel layer higher toward the rear of the aquarium to give a better visual appearance.

The side and rear edges of the plates are joined together by side and rear walls to define the chambers within the system.

The plates and walls may be sealed together using any appropriate means. Small plastic screws or other corrosion resistant fasteners can be used, as well as inert adhesives.

For use in aquariums of up to about 150 gallons, it is preferable to maintain a maximum height, at the rear of the purification system, of about 1 and ⅜ inches (3.5 cm). This dimension may be varied as required depending on the size of the aquarium and the components used in the filtration system.

In an alternative preferred embodiment, the system is in the form of three conduits disposed one inside the other. The centermost or first conduit defines therein the first chamber. The wall of this first conduit is apertured, and supports a microfilter mesh, to provide filtration for liquid passing through the apertures.

A second conduit is disposed around the first conduit to form, therebetween, the second chamber.

A third conduit, formed with a porous wall, is disposed around the second conduit to form, therebetween, the third chamber. Upward extensions for the third conduit may be provided, as with the first embodiment, to bypass some water from gravel filtration.

The channeling valve for this alternative embodiment may be basically the same as the valve for the first embodiment or a modification thereof. In either case, it will be formed as a free standing separate unit and preferably have suitable nipples or other structures to permit easy connection thereto with connectors to the various conduits.

The channeling valve, which is an important feature of the filtration system, is selectively switchable between a system filtration mode and a system regeneration or backwash mode. The channeling valve preferably comprises a special rotor in the form of intersecting cross-bar arms with the valve control knob extending upwardly therefrom. The cross-bar arms may take any suitable form as will be understood from the detailed description of its operation.

A channeling ring in the form of a cylinder circumscribes the rotor and, in the first preferred embodiment, extends from the base plate to the upper plate of the system. Alternatively, it may be self contained with suitable inlet connectors or nipples.

The channeling ring or valve wall has a total of six openings in its perimeter providing fluid communication between the valve and the chambers. With a simple cross-arm rotor, openings are angularly spaced 30° apart from each other and have an arcuate extent of about 30° with a height preferably coextensive with the height of the chamber into which they open. Modified rotors may be used if larger openings are required. Pairs of the openings are disposed in the same plane to open into the same chamber, as follows:

The upper ring openings communicate with the upper or third chamber and are disposed opposite to each other. The upper chamber may be divided into two separated portions, one portion being normally larger than the other. The perforations of the top plate communicate with the larger portion of the upper chamber to form a gravel filter support. The smaller portion forms a pump conduit between the valve and a pump outlet. One of the upper openings communicates with the larger chamber portion and the other one of the upper openings communicates with the smaller chamber portion. For convenience of terminology, and because it is usual to dispose the motor in a rearward portion of the aquarium, the upper ring openings will be considered as being in the front and in the rear of the ring. The rearward opening communicates with smaller portion of the upper chamber through which the valve is connected to an outlet of the system and therethrough to a suction pump.

Alternatively, only one upper or third chamber may be provided. This will have a perforated outer wall to permit liquid to flow therein while filtering out gravel. A separate pump conduit is provided to communicate between the valve and the suction pump.

Spaced an angular distance of about 30° on each side of the upper rear ring opening, and in the plane immediately therebelow, are a second pair of openings in communication with the second chamber. With elongated cross-arm construction for the rotor, these openings can be elongated. The second chamber is the chamber above or surrounding the filter layer, depending on the embodiment.

Disposed an angular distance of about 30° on each side of the upper forward ring opening, and in the plane below the second chamber, are a third pair of openings in communication with the lower chamber. Again, these may be elongated if necessary, by using an extended rotor cross-arm construction. The lower chamber is below, or surrounded by the filter layer, depending on the embodiment.

The rotor is rotatably supported in the channeling ring or cylinder. The two cross bars intersect at right angles to each other to form a cross. One of the bars extends upwardly from the base plate or the bottom of the valve to the top plate or top of the valve while the other cross bar extends upwardly from the base plate to a position above the second pair of ring openings and short of the top plate.

Alternatively, the second cross bar can be replaced by diametrically opposed sector extensions of the first bar. The first sector being centrally (middle) disposed and of sufficient extent to be operable to close the second (middle) pair of openings. The second sector being disposed at the bottom. This permits control of larger (about 90°) openings into the valve for higher flow rates. The spacing of the openings and operation of the valve will need to be suitably modified.

Means is provided whereby the rotors can be selectively rotated in the valve to cause water flowing through the system to flow either downwardly through the filter layer to filter the water, or upwardly through the filter layer to backwash said filter layer free of impurities. When water is caused to flow upwardly through the filter layer, it is normally disgarded from the system. The terminology "filter" and "backwash" or "cleaning" is applied arbitrarily herein to "downward" or "inward" and "upward" or "outward" flows, respectively, through the microfilter layer. Unless the microfilter employed has a preferred filtering flow direction therethrough, it does not matter in which direction one choses the water to flow through the microfilter to filter the water. Switching the valve to reverse the direction of flow of water through the filter will backwash the filter to flush the system.

In the filtering mode, the clean water existing from the pump is returned to the aquarium. In the backwash mode, the flushed water is discharged from the aquarium. In the filtering mode, aeration devices utilizing the venturi effect to draw air into the outflow of water from the pump can also be included in the system as required, especially when the system is used in a home aquarium.

DESCRIPTION OF THE PREFERRED EMBODIMENT

Figure 1:
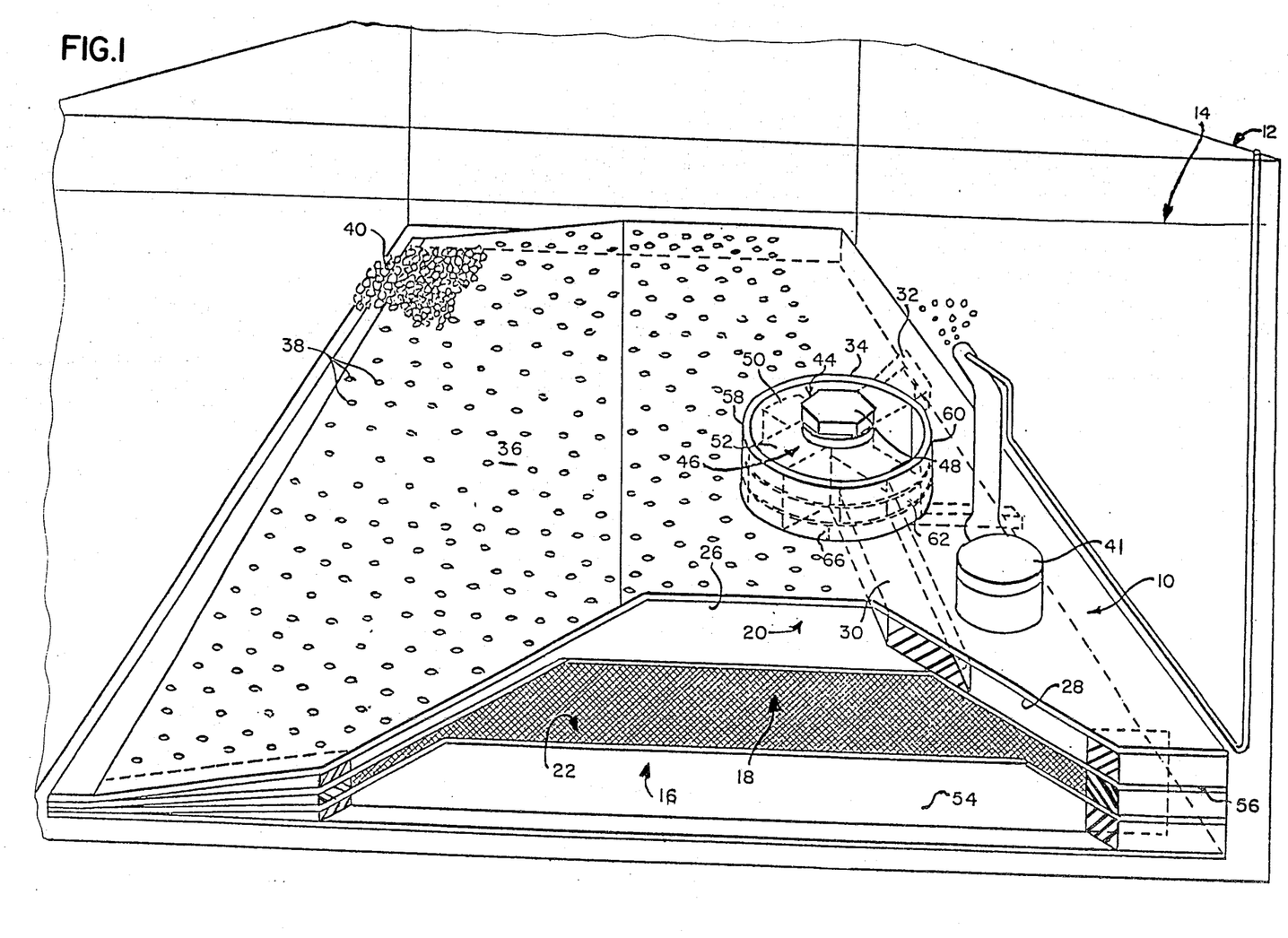
FIG. 1 is a diagrammatic view, partially in section, of a filtration system according to the present invention, as used in an aquarium.

FIG. 1 illustrates a filtration system 10 according to the present invention disposed in the bottom of a home aquarium or tank 12 containing water 14 to be filtered.

The filtration system 10 has a closed first or lower chamber 16, a closed second or middle chamber 18, and a third or upper chamber 20. A microfilter 22, preferably one capable of filtering particles down to about 20 microns or less, is provided between the lower chamber 16 and the middle chamber 18. In the presently preferred embodiment, microfilter 22 is in the form shown in FIG. 6 as 22A which comprises filter elements 24 secured to a support 26. Microfilter 22A is presently preferred because filter elements 24 are readily available which meet the requirements of the present invention and do not have to be specially manufactured. Such elements are presently used, for example, in a universal water filter available under the trademark Unitron from Ehrenreich Photo-Optical Industries, Inc., Woodbury, New York 11797. The filter element used in the water filter is described as a 20 micron (450 mesh) polyester screen. However, as will be obvious from the description of the invention, any filter element capable of filtering down to about 20 microns can be disposed between the lower chamber 16 and middle chamber 18 and result in adequate operation of the present device. A finer microfilter may be desirable especially if disease microorganisms are to be removed.

The upper chamber 20 is divided into first and second parts 26, 28, respectively, by means of dividers 30, 32 and a peripheral portion of a cylindrical valve wall or channeling ring 34. The channeling ring 34 will be more fully described in connection with the channeling valve portion of the invention as hereinafter described.

A top plate 36 covers the upper chamber 20 and contains openings therethrough, such as perforations or slots 38, to communicate the water 14 held in tank 12 with the first part 26 of the upper chamber 20. There are preferably no such openings 38 in the portion of top plate 36 covering the second part 28 of the upper chamber 20, for optimum operation of the device. As the top plate 36 is intended to support a layer of gravel 41 for removal of larger particles, as is usual in bottom filters, the openings or perforations 38 will need to be smaller than the gravel chosen for the initial filtering to restrain the gravel 40 from falling into the upper chamber 20.

Figures 2, 5, 6:
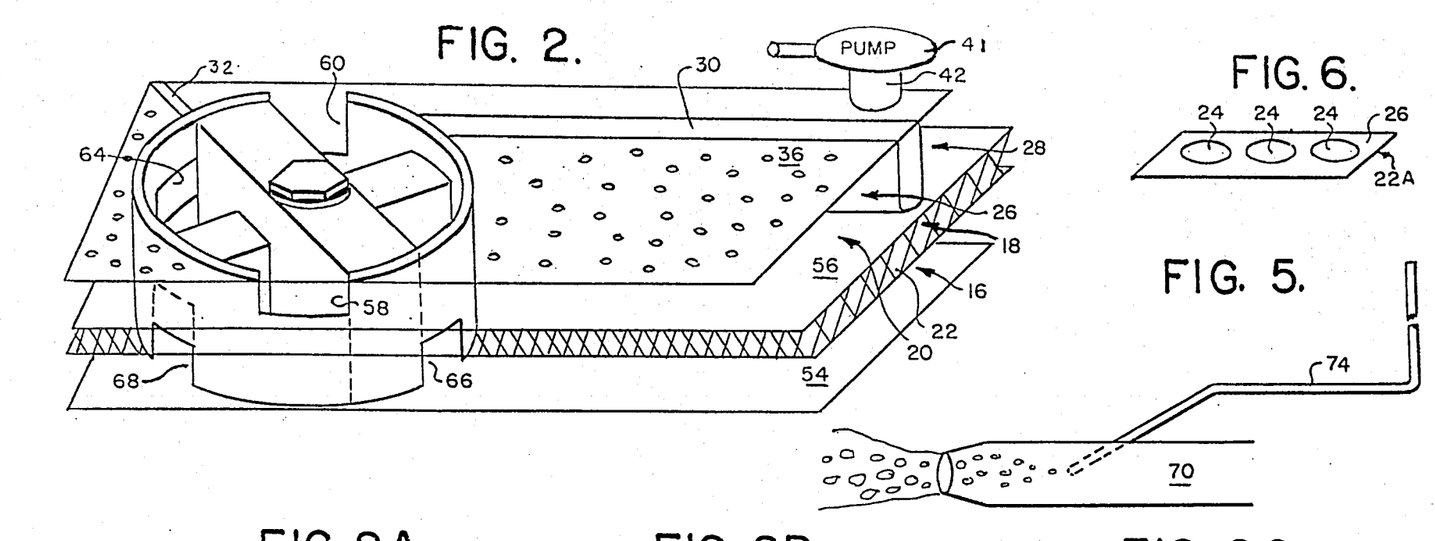
FIG. 2 is an enlarged perspective view of a channeling valve of the system positioned in the filtration mode.
FIG. 5 shows a detail of a venturi effect aeration device for attachment to the outlet of the pump.
FIG. 6 shows an embodiment of a microfilter for use in the invention.
Figures 3, 4:
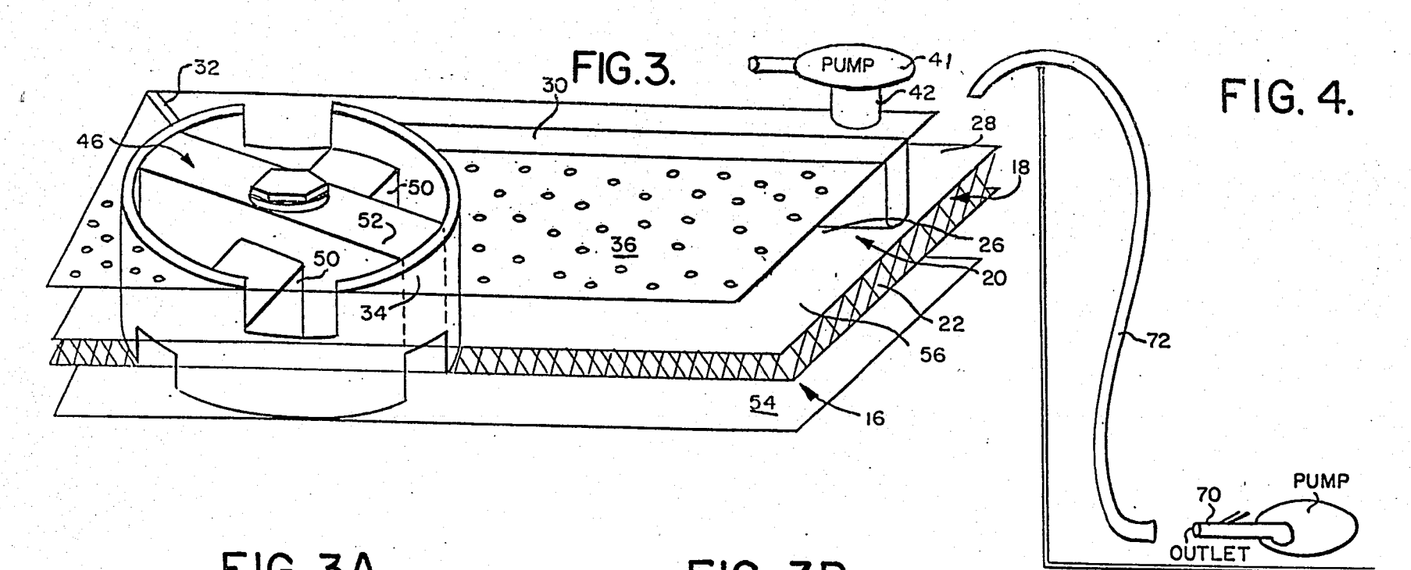
FIG. 3 is an enlarged perspective view of the channeling valve of FIG. 2 positioned in the regeneration or backwash mode.
FIG. 4 shows a drain conduit secured to the pump for discharging the backwashed flushed water from the aquarium.
Figure 3A:
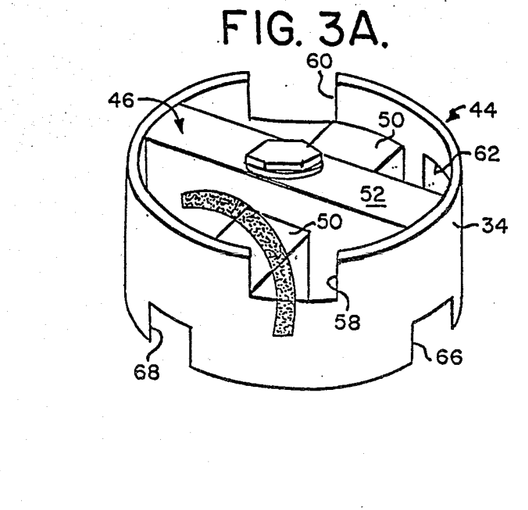
FIGS. 3A, 3B and 3C show the progressive flow of water through the channeling valve positioned in the regeneration mode.
Figure 3B:
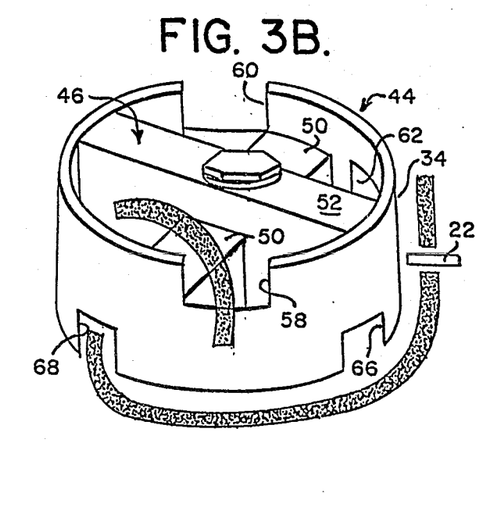

Referring to FIGS. 2 and 3, a suction pump 41 has its inlet 42 in communication with the second part 28 of upper chamber 20. The absence or substantial absence of perforations in the portion of top plate 36 overlying the second part 28 of upper chamber 20 permits the said second part 28 to act as an effective conduit between the cylindrical valve wall 34 and the pump 41. Although some openings or perforations communicating with the second part 28 may be tolerated, depending on the capacity of the pump, they will generally reduce the efficiency of the filtration system by permitting water to bypass most of the filter system 10, as will be evident from the description of the operation below.

An important feature of the device is the channeling valve represented generally by numeral 44. Channeling valve 44 is composed of a special cross rotor 46 closely fitting into the cylindrical valve wall or channeling ring 34 and having a projection in the form of a rotatable knob 48 extending through top plate 36. For convenience, knob 48 can be formed with a polygonal cross section to facilitate easy engagement with an elongated wrench (not shown) which can be inserted into the tank 12 to rotate knob 48, and the rotor 46 connected thereto, from outside the tank 12.

The cross rotor 46 has a set of arms 50, 52 that intersect at right angles and pass through each other. Both intersecting arms 50, 52 extend upwardly from the bottom plate 54 of the filtration system 10 through microfilter 22 up to the middle plate 56 which separates the upper chamber 20 from the middle chamber 18. Bottom plate 54 also serves to seal the bottom of the lower chamber 16. A first of the intersecting arms 50 stops at the middle plate 56. The second intersecting arm 52 extends up to the top plate 36. The cylindrical valve wall or channeling ring 34 also extends from the bottom plate 54 up to the top plate 36 and circumscribes the rotor 46.

Referring to FIGS. 1, 2 and 3, the channeling ring 34 has a total of 6 openings 58, 60, 62, 64, 66 and 68 grouped in pairs which communicate with the respective chambers. Thus, upper openings 58, 60 communicate with upper chamber 20. A first of these upper openings 58 is located to be in communication with the first part 26 of the upper chamber 20 while the other of these upper openings 60 is diametrically located to be in communication with the second part 28 of the upper chamber 20. The middle openings 62, 64 of ring 34 communicate with middle chamber 18, and the lower openings 66, 68 of ring 34 communicate with the lower chamber 16.

The openings in the channeling ring 34 are separated 30° apart from each other (60° measured center to center), although in different planes as described above. More specifically, the forwardly facing first upper opening 58 is spaced 180° from the second or rearwardly facing second upper opening 60 (measured center to center). The middle openings 62, 64 are separated by an angular distance of about 30° (60° measured center to center) on each side of the upper rear opening 60 and are located in the plane of the middle chamber 18. The lower openings 66, 68 are separated by an angular distance of 30° (60° measured center to center) on each side of the upper forward opening 58 and are located in the plane of the lower chamber 16. Each opening is preferably the height of the chamber into which it opens and extends an angular or arcuate distance of about 30°. This gives a maximum opening size, and therefore, a maximum flow of water through the filter within the constraints of the channeling valve 44.

It is thus apparent that the space between top plate 36 and middle plate 56 defines the upper chamber 20; the space between middle plate 56 and the support of microfilter 22 defines the middle chamber 18; and the space between the support of microfilter 22 and bottom plate 54 defines the lower chamber 16. As previously indicated, the top plate 36 tapers downwardly and in a forward direction. The front edges of the plates are sealed together, and side and rear walls are provided to seal the side and rear edges of the plates to also define the chambers of the system.

In FIGS. 7-11, elements performing a similar function to those described above have been given the same number increased by 100 or 200. Other elements have been numbered starting with 300.

Figures 7, 8:
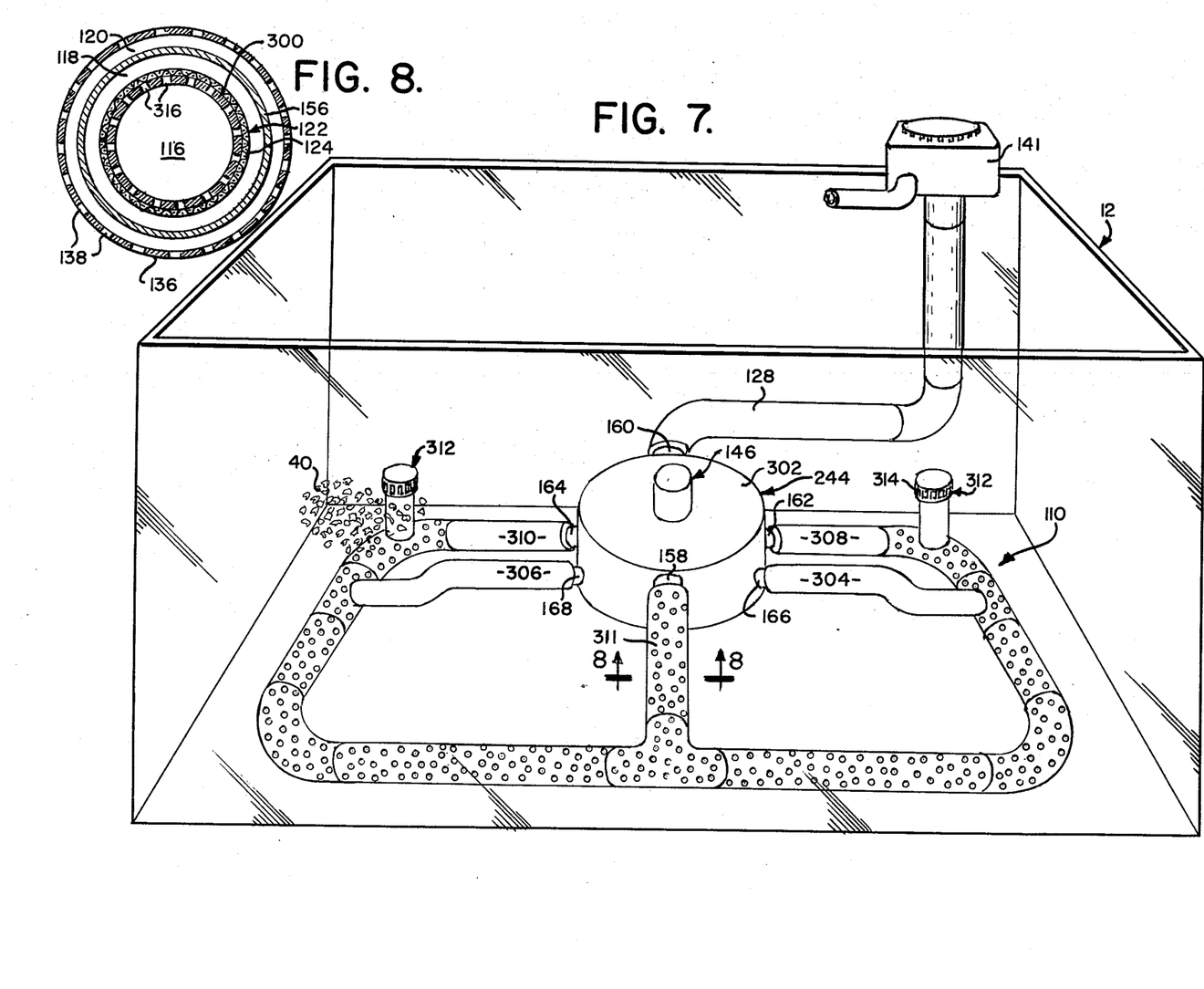
FIG. 7 is a perspective view of a second embodiment of the filtration system according to the present invention, as used in an aquarium.
FIG. 8 is a sectional view of the system of FIG. 7, taken along line 8—8 of FIG. 7.

FIGS. 7 and 8 show a second embodiment of the system 110 wherein the first, second and third chambers (116, 118, 120) are defined by concentrically disposed chamber conduits (136, 156, 300). For aquarium use, semi-rigid conduits of non-toxic synthetic material commonly used in aquaria, can be used. About 1-1½" tubing is suitable and can be made in lengths as required.

The valve 244 may be similar in construction to valve 44 of the embodiment of FIGS. 1-6, except that it is contained in a closed housing 302 and the opening into the housing are provided with nipples 158, 160, 162, 164, 166, 168. The cross rotor 146 may be identical to that previously used. The operation of the valve 244 would then be identical to that of the valve described above. An alternative valve embodiment, as described below, can also be similarly modified for use herewith.

Figures 12, 13:
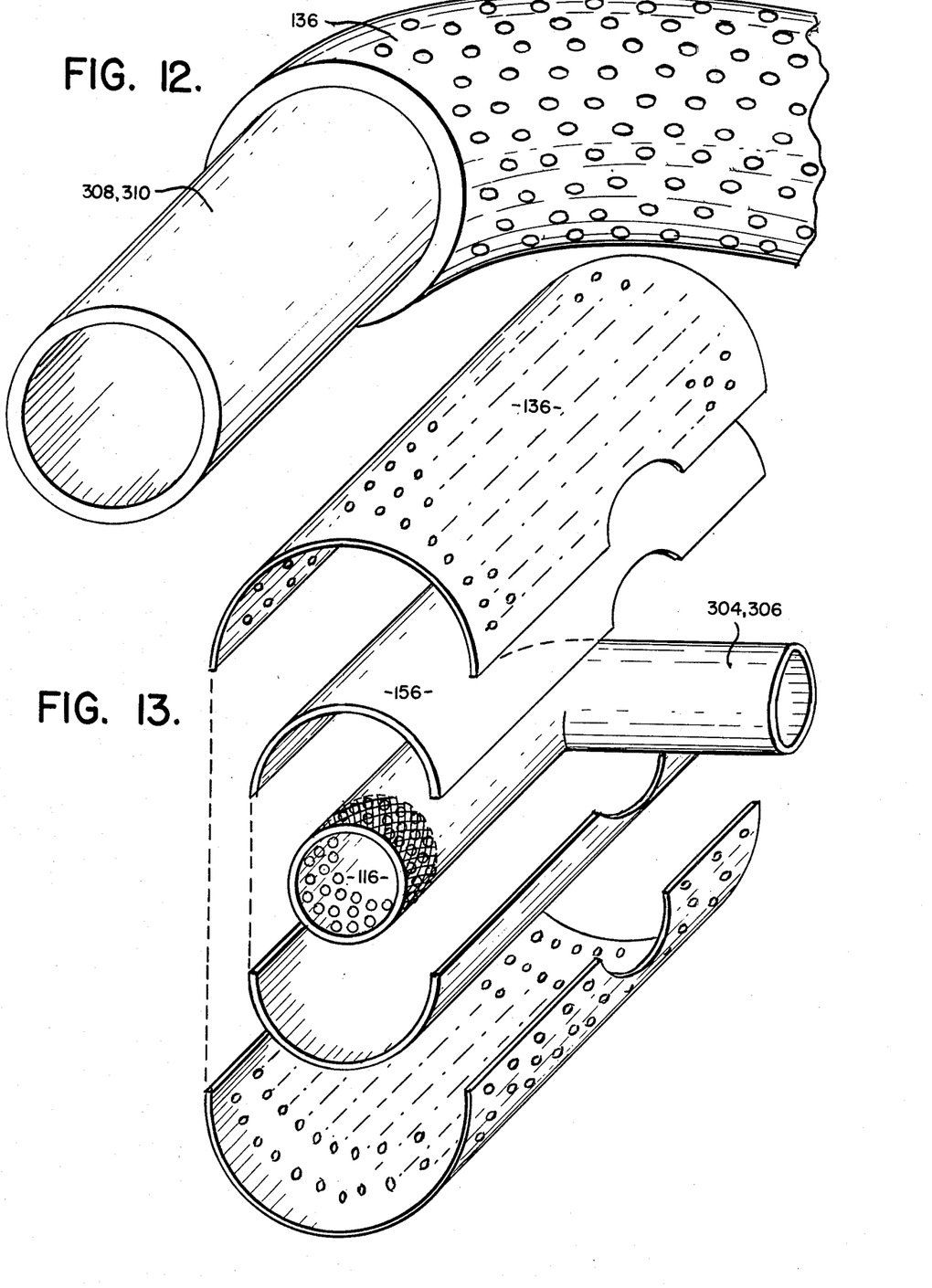
FIG. 12 shows an enlarged view of a second chamber conduit for connecting the second chamber of the embodiment of FIG. 7, to the channeling valve.
FIG. 13 shows an exploded enlarged view of a first chamber conduit for connecting the first chamber of the embodiment of FIG. 7, to the channeling valve.

Connection between the valve 244 and the first, second and third chambers 116, 118, 120, is accomplished by first chamber conduits 304, 306, second chamber conduits 308, 310, and by third chamber conduit 311. A pump conduit 128 provides communication between the valve 244 and the pump 140. These conduits are secured to or formed as extensions to the ends of the various chamber conduits (FIGS. 7, 12, and 13).

With reference to FIG. 8, microfilter 122, which separates first and second chambers 116, 118 is preferably in the form of first conduit 300 with perforated walls. A filter element 124, preferably in the form of a polyester screen mesh as described above, is supported on first conduit 300 and covers the perforations 314 therethrough.

As with the embodiment of FIGS. 1-6, water is drawn through perforated outer wall 136 (FIG. 8) and into third chamber 120. Channeling valve 244 directs or channels the water into second or middle chamber 118 from which it is drawn through microfilter 122 and into first chamber 116. From first chamber 116 the water passes into channeling valve 244 and out pump conduit 128 to pump 140.

Backwashing is accomplished by reversing the direction of flow through microfilter 122.

Figures 9, 10A, 11A:
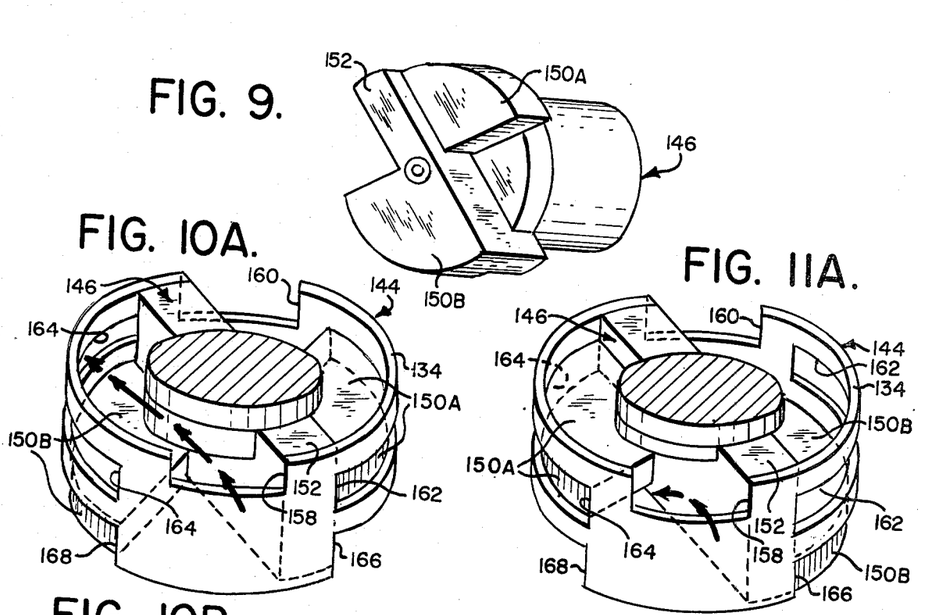
FIG. 9 is a perspective view of a modified valve rotor.
FIGS. 10A-10C show a modified valve using the rotor of FIG. 9, and the progressive flow of water therethrough, when the valve is positioned in a filtration mode.
FIGS. 11A-11C show the progressive flow of water through the valve of FIGS. 10A-10C set in a regeneration mode.
Figure 10B:
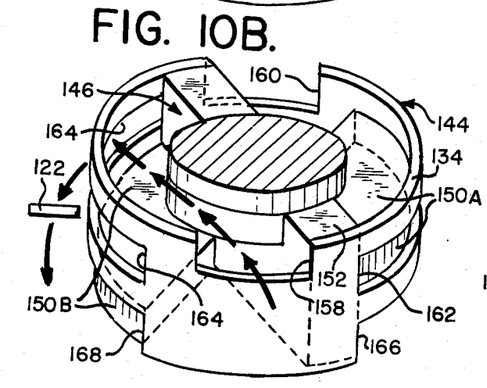
Figure 10C:
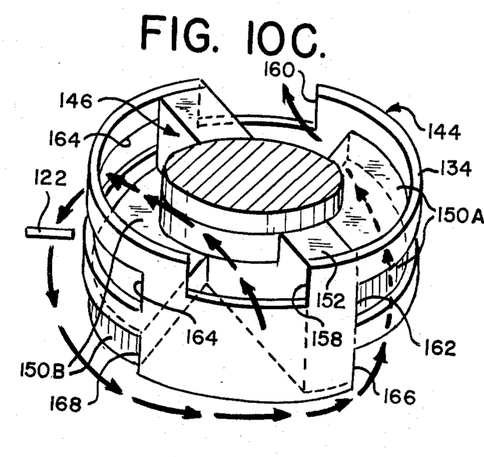
Figure 11B:
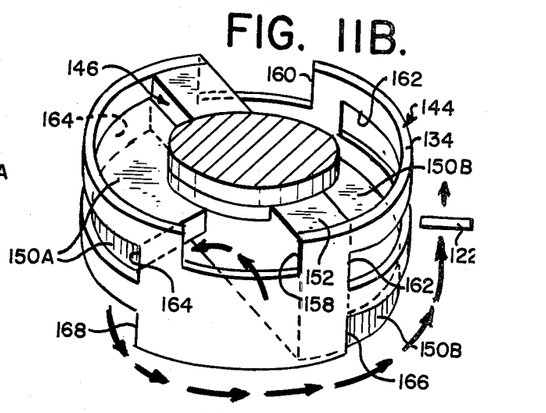
Figure 11C:
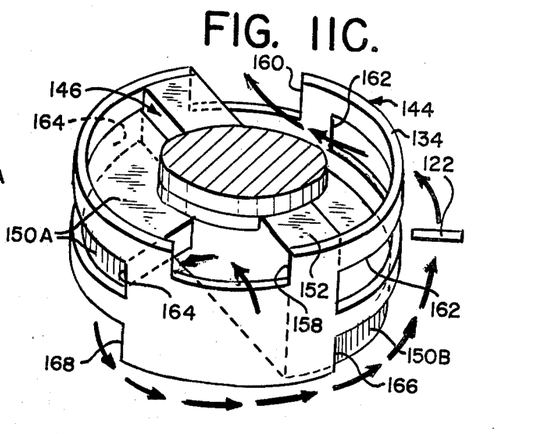

FIGS. 9-11 show a modified valve 144 which is similar to the valve 44 shown in FIGS. 1-6 in construction and operation. The rotor 146 has been modified and has only one "cross-arm" 152. In place of a second arm, are two sectors 150A, 150B. These sectors 150A, 150B preferably extend approximately 90° in diametrically opposed relation to each other and are in different, and adjacent planes. They each have a thickness corresponding to the height of the openings in the valve wall 134 over which they are disposed during operation of the valve 144. Because only one cross-arm is used to control larger (about 90°) openings, to change from filter to backwash requires 180° rotation of the cross-arm as opposed to a short (about 30° or less) rotation required by the first valve embodiment 44.

A principal advantage of the second valve embodiment 144 is the capability of controling larger openings in the valve. This permits a more compact valve to be used to control larger flow rates with a minimum of resistance.

Operation of the Device

The operation of the first embodiment filtration system 10 is generally as described below with reference to FIGS. 1 and 2 and FIGS. 2A, 2B and 2C which show the passage of water through the channeling valves 44 when the channeling valve is in a "filtering" mode or position. The second embodiment system 110 is substantially identical in operation although the form of the chambers differs.

Figure 2A:
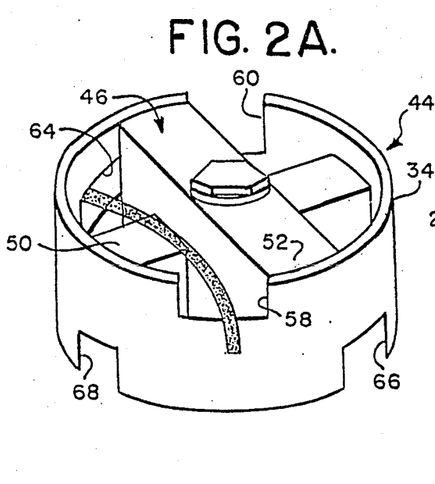
FIGS. 2A, 2B and 2C show the progressive flow of water through the channeling valve positioned in the filtration mode.
Figure 2B:
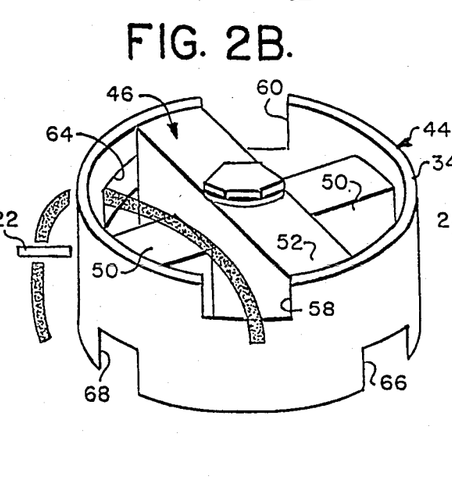
Figure 2C:
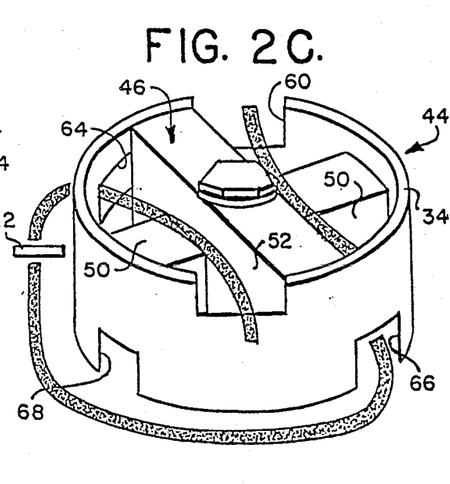

More specifically, water enters the first part 26 of the upper chamber 20 (third chamber 120 FIG. 8) percolating through gravel 41 and thereafter through perforations 38 (138) in top plate 36 (outer surface 136). The water then passes through the first or forward opening 58 in channeling valve ring 34. As shown in FIG. 2A, the water is blocked by arm 52 of the cross rotor 46 but passes over arm 50 and thereafter out of the valve 44 through middle opening 64 of ring 34 into closed middle chamber 18 (118). The water thereafter is drawn through the microfilter 22 (122) and into lower chamber 16 (see FIG. 2) (first chamber 116 FIG. 8). With reference to FIG. 2C, the water is thereafter drawn into lower opening 66 of ring 34 and passes over rotor arm 50 and out through the rear upper opening 60 of ring 34 into the second part 28 of the upper chamber 20 (see also FIG. 2) (pump conduit 128, FIG. 7). Pump 41 (141) draws water out of the second part 28 (pump conduit 128) thereby driving the system as hereinabove described.

For some applications, especially marine (salt-water) aquaria, it is desirable to filter free-swimming organisms from the water and flush them from the tank. Extension 312 (FIG. 7) can be attached to the third chamber 120 (or upper chamber 20) to bypass the gravel layer 40, for this purpose. A simple slotted cap valve 314, as are usual in aquaria, can be adopted to control the amount of bypass water.

Figure 3C:
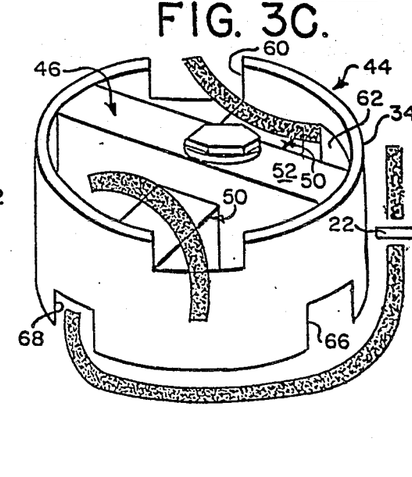

When rotor 46 is set in a "cleaning" mode to backwash microfilter 22, as shown in FIG. 3 and FIGS. 3A-3C, the path of the water flowing through the system is similar to that described above but flows in an opposite direction through the microfilter 22 (122). More specifically, the water passes through the perforated top plate 36 (outer surface 136) into the first part 26 of upper chamber 20 (120) and then into valve 44 (144) through the upper opening 58 of ring 34 and over rotor arm 50. However, because the rotor 46 has been rotated to the position shown in FIG. 3, the water is now directed out through the lower opening 68 or ring 34 from whence it passes into lower chamber 16 (first chamber 116) and upwardly through microfilter 22 (122). Thus, in this mode, rather than pass from middle chamber 18 (second chamber 118) to lower chamber 16 (first chamber 116) through microfilter 22 (122), water passes in the opposite direction from lower chamber 16 (116) and into middle chamber 18 (118). By passing in this direction, the water flushes material retained on microfilter 22 (122) into the middle chamber 18 (see FIG. 3) (118 FIG. 8). Thereafter, as shown in FIG. 3C, the water passes through the middle opening 62 of ring 34 and back into valve 44 wherein it flows over rotor arm 50 and out through the rear upper opening 60 of the ring.

As with the filtering mode described above with respect to FIGS. 2, 2A-2C, the water passes out through rear upper opening 60 of ring 34 and into the second portion 28 of upper chamber 20 (pump conduit 128) to be pumped out through pump 40 (140). In this mode, as the water contains particulate matter previously filtered from the system, it is usual to attach to the pump outlet 70, a drain conduit 72 which exits outside of the tank, as shown in FIG. 4. In this manner, particulate matter formally retained on microfilter 22 is flushed from the system. Once the water flushes clean, the valve 44 is returned to its filtering position and the drain conduit removed to permit recirculation of the water in the tank.

The operation of valve 144 shown in FIGS. 9A-C and 10A-C is similar in detail with the operation described above for valve 44. The direction of flow of water therethrough is identical as can be seen by comparing FIGS. 9A-C and 10A-C with corresponding FIGS. 2A-C and 3A-C discussed in detail above.

In the filtering mode, the outlet 70 from the pump can be provided with an air inlet tube 74 through which air can be introduced into the system, as shown in FIG. 5. In its simplest form, air inlet tube can simply be disposed above the water level whereby air will be drawn into the system by the venturi effect.

While a preferred embodiment of the invention has been shown and described in detail, it will be readily understood and appreciated that numerous omissions, changes and additions may be made without departing from the spirit and scope of the present invention.

What is claimed is:

1. A filtration system for disposition under gravel on the bottom of a tank containing liquid to be filtered, and operable to be connected to a suction pump whereby liquid is drawn therethrough, comprising in combination:

(a) a closed first chamber;
(b) a closed second chamber;
(c) microfilter means forming a filter conduit between said first and said second chambers and being operable to filter particles from liquid passing through said filter conduit;
(d) a third chamber including an outer wall, said outer wall being perforated to permit the liquid to pass therethrough but to prevent gravel from passing thereinto;
(e) a pump conduit including a pump outlet operable to communicate with the suction pump;
(f) a valve connected to said first, second and third chambers and to said pump conduit and being operable between a filtering first position and a cleaning second position, said valve, in its filtering first position, simultaneously forming first and second liquid conduits, said first conduit being connected to, and providing liquid communication between said third chamber and said second chamber, and said second conduit being connected to and providing liquid communication between said pump conduit and said first chamber, whereby operation of the pump to remove liquid from said pump conduit will cause liquid to be drawn first through the gravel and the perforations in said outer wall into said third chamber, thereafter through said first conduit of said valve to said second chamber, then in a first flow direction through said microfilter means filter conduit into said first chamber from which it passes through said second conduit of said valve to said pump conduit to be discharged by the pump; and said valve, in its cleaning second position, simultaneously forming third and fourth liquid conduits, said third conduit being connected to and providing liquid communication between said third chamber and said first chamber, and said fourth conduit being connected to and providing liquid communication between said pump conduit and said second chamber, whereby operation of the pump to remove liquid from said pump conduit will cause liquid to be drawn first through the gravel and the perforations in said outer wall into said third chamber, thereafter through said third conduit into said first chamber, then in a second flow direction opposite to said first flow direction through said microfilter means filtering conduit into said second chamber from which it passes through said fourth conduit of said valve to said pump conduit to be discharged by the pump.

2. The filtration system of claim 1 wherein said first, second and third chambers are stacked one above the other;
said first chamber being comprised of a lower chamber;
said second chamber being comprised of a middle chamber; and
an upper chamber including a wall dividing said upper chamber into first and second parts, said first part comprising said third chamber; and said second part comprising said pump conduit;
said outer wall comprising a perforated top plate covering said first part of said upper chamber.

3. The filtering system of claim 1 comprising:
inner, middle and outer chamber conduits, said inner chamber conduit having apertured walls and defining therein said first chamber;
said middle chamber being disposed about said inner chamber conduit, said second chamber being defined between said inner and middle chamber conduits; and
said outer chamber conduit being disposed about said middle chamber conduit, and comprising said outer wall; said third chamber being defined between said middle chamber conduit and said outer chamber conduit;
said microfilter means comprising a mesh screen element supported on said inner chamber conduit and covering the apertures in the walls thereof, to filter liquid passing through the apertures.

4. The filtration system of claim 1, wherein said microfilter means comprises 450 mesh polyester screen elements mounted in a solid support to filter particles down to about 20 microns.

5. The filtration system of claim 2, wherein said valve comprises:
(a) a cylindrical valve wall extending from said lower chamber to said upper chamber;
(b) a rotor rotatably mounted in said valve wall and including first and second intersecting arms;
(c) said valve wall having first and second openings extending therethrough into said lower chamber, third and fourth openings extending therethrough into said middle chamber, and fifth and sixth openings extending therethrough into said upper chamber, said fifth opening communicating with said first part of said upper chamber and said sixth opening communicating with said second part of said upper chamber;
(d) said first rotor arm being operable, in said filtering first position, to block both said third opening to said middle chamber and said second opening to said lower chamber to form said first liquid conduit between said first opening to said lower chamber and said sixth opening to said second part of said upper chamber, and simultaneously to form said second liquid conduit between said fourth opening to said middle chamber and said fifth opening to said first part of said upper chamber, and said second rotor arm being operable in said filtering first position to separate, from liquid communication therebetween, said first and second liquid conduits.

6. The filtration system of claim 5, wherein said first rotor arm being further operable, in said cleaning second position, to form said third liquid conduit between said sixth opening and said third opening, and simultaneously to form said fourth liquid conduit between said fifth opening and said second opening, said second rotor arm being operable in said cleaning second position to separate, from liquid communication therebetween, said third and fourth liquid conduits, and simultaneously to block said first and fourth openings.

7. The filtration system of claim 5 or 6, wherein said upper, middle and lower chambers are serially stacked one upon the other, said lower chamber including a solid bottom plate, said cylindrical valve wall extending from said bottom plate to said top plate of the upper chamber, said rotor being mounted within said cylindrical valve wall and being rotatable about an axis coincident with the axis of said cylindrical wall, said first rotor arm intersecting said second rotor arm at right angles along the axis of the cylindrical wall, the opposite ends of each of said rotor arms being substantially in abutment with said wall, said first rotor arm extending from said bottom plate to a position below said top plate and above said third and fourth openings, and said second rotor arm extending from said bottom plate to said top plate, said fifth and sixth openings being angularly disposed approximately 180 degrees apart through said valve wall, said third and fourth openings being disposed approximately 30 degrees from and on each side of said sixth opening, and said first and second openings being disposed approximately 30 degrees from and on each side of said fifth opening.

8. The filtration system of claim 5 or 6, wherein said microfilter means comprises 450 mesh polyester screen elements mounted in a solid support to filter particles down to about 20 microns.

9. An aquarium comprising a water tight container having a bottom and side walls for holding water and fish or other water animals or plants, and the filter system of claim 1, 2 or 3, said filter system being disposed on said bottom of said container, a layer of gravel supported on said filter system, and a pump, said pump being operably connected to said pump outlet for removal of water therethrough from said filtration system.

10. An aquarium comprising a water tight container having a bottom and side walls for holding water and fish or other water animals or plants, and the filter system of claim 7, said filter system being disposed on said bottom of said container, a layer of gravel supported on said filter system, and a pump, said pump being operably connected to said pump outlet for removal of water therethrough from said filtration system.

11. The aquarium of claim 2, wherein said top plate includes a forward portion which tapers downwardly toward said bottom plate at an approximately 30 degree angle; said gravel being supported on said top plate to provide an esthetically pleasing bottom surface for said aquarium.

* * * * *